INVENTORS
JOHN J. ROEMER,
DONALD W. KAISER,
BY
Charles L. Harness
ATTORNEY

Patented Aug. 11, 1953

2,648,669

UNITED STATES PATENT OFFICE 2,648,669

REACTION PRODUCT OF SODIUM DICYANAMIDE AND HYDROXYLAMINE HYDROCHLORIDE

John J. Roemer, North Stamford, and Donald W. Kaiser, Old Greenwich, Conn., assignors to American Cyanamid Company, New York, N. Y., a corporation of Maine Application May 29, 1951, Serial No. 228,878

2 Claims. (Cl. 260—307)

1

The present invention relates to the preparation of a new compound of the probable formula 3,5-diamino-1,2,4-oxadiazole,

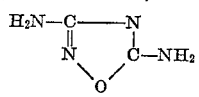

The new compound can be prepared as follows.

Figure 1:
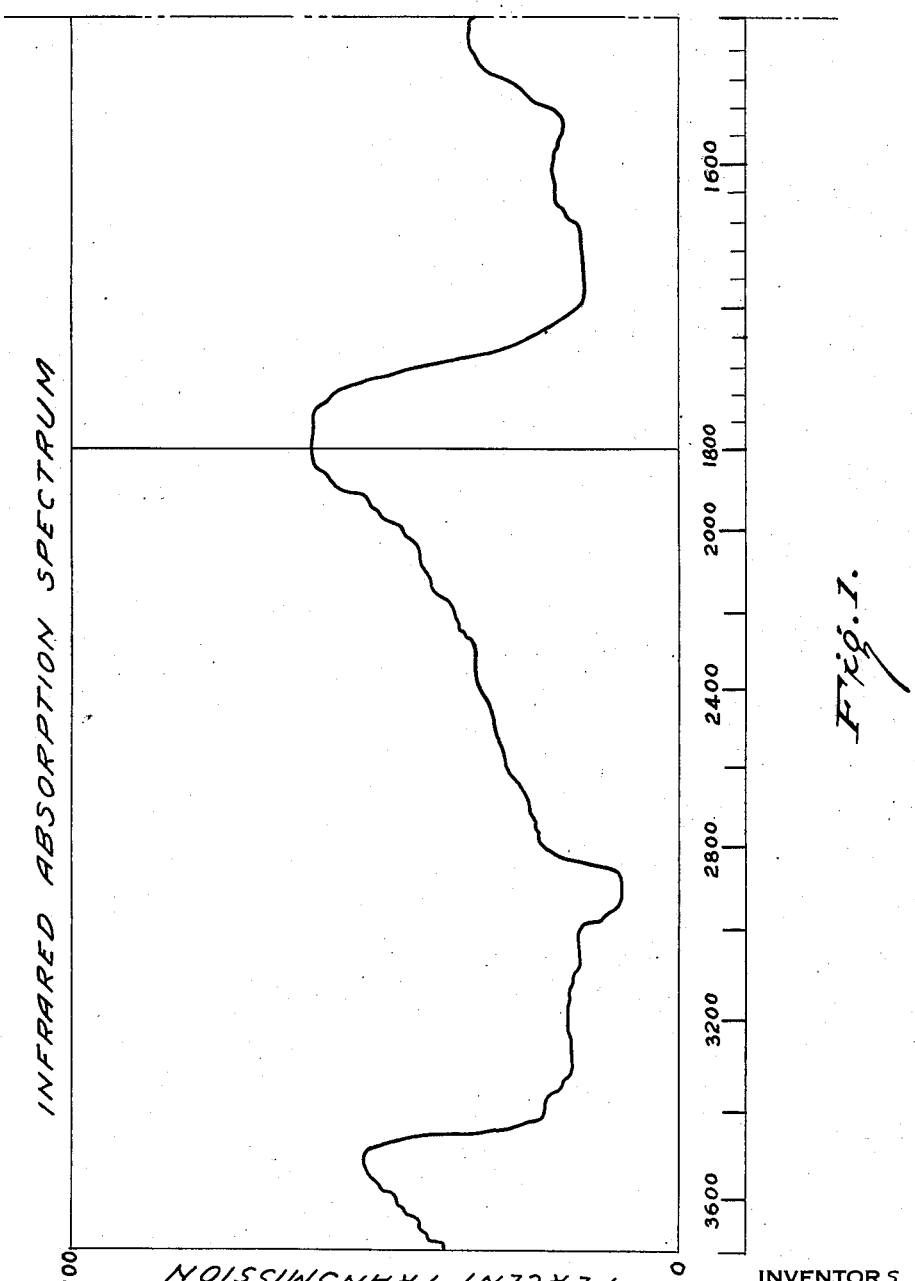
Figure 1A:
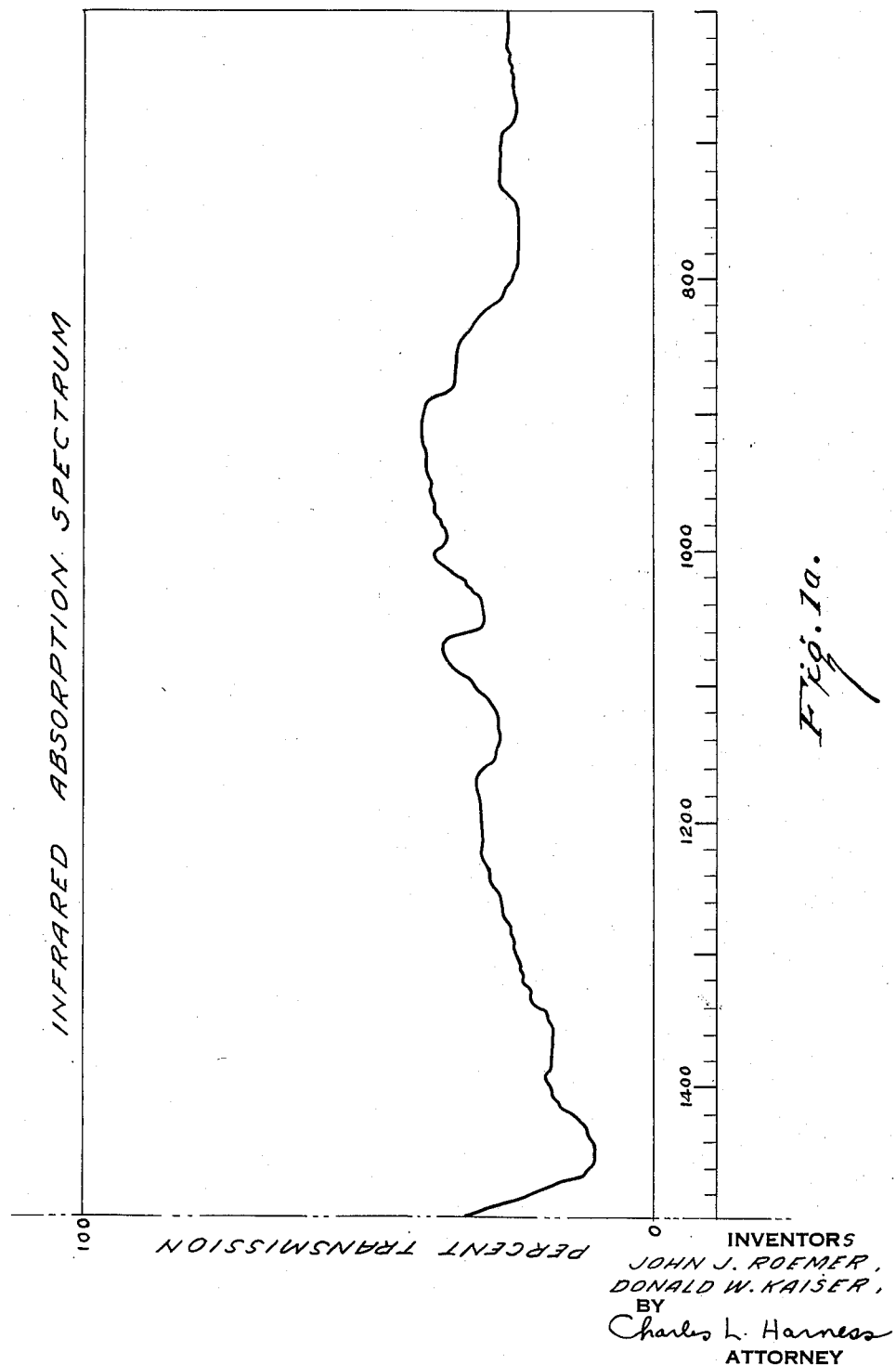

1 mol of hydroxylamine hydrochloride and 1 mol of sodium dicyanamide (also called sodium dicyanimide by the older nomenclature) are slurried in 500 cc. of methanol at room temperature and stirred for about 45 minutes, during which time the temperature reaches about 45° C. This mixture is then refluxed for about ½ hour to complete the reaction, cooled, and the byproduct sodium chloride filtered. The filtrate is then evaporated under reduced pressure whereby 111 g. of crude product crystallizes from solution. The crude material is crystallized from water several times until its melting point is 167° C. The pure compound analyzes carbon=24.24%, hydrogen=1.4%, and nitrogen=57.01%, corresponding to a formula of $C_2H_4N_4O$. The compound is believed to be 3,5-diamino-1,2,4-oxadiazole. In the absence of absolute certainty as to the identity of the compound, it is characterized by its infrared absorption spectrum given in Figures 1 and 1-a. This spectrum was taken on a sample of the product mulled in a mixture of hydrocarbon oils (Nujol) in the usual way. The spectrum is characterized by absorption bands in the region of 3500, 1800, 1520, 1075, 1000, 900, and 720 reciprocal centimeters.

While the above example sets forth a preferred mode of preparing the compound, various substitutions and variations in that procedure can be adopted. For example other salts of hydroxylamine such as sulfate, acetate, nitrate, phosphate, etc., can be used, and other metal salts of dicyanamide can be used such as potassium, ammonium, or calcium dicyanamide and the like. Other solvents can also be employed such as Cellosolve, butanol, and the like. It is not absolutely necessary to reflux the reaction mixture, as some of the desired compound is obtained by permitting the reactants to stand at room temperature for a few hours. The ratios of reactants can, of course, vary (e. g., in the hydroxylamine salt:dicyanamide salt mol ratio of 1:1–100), but when a reagent excess is used over the theoretical, such excess remains unreacted and must be recovered as by fractional crystallization or the like.

The new product is useful as an intermediate in the preparation of synthetic resins, dyes, pharmaceuticals, and photographic reagents.

While the invention has been described with particular reference to specific embodiments, it is to be understood that it is not to be limited thereto but is to be construed broadly and restricted solely by the scope of the appended claims.

We claim:

1. The method of preparing a compound of the formula $C_2H_4N_4O$ which comprises subjecting a hydroxylamine salt to the action of a metal salt of a dicyanamide in an inert solvent at a reaction temperature of at least room temperature.

2. The method according to claim 1 in which the hydroxylamine salt is the hydrochloride, the dicyanamide salt is sodium dicyanamide, the solvent is methanol, and the reaction is carried out at reflux temperature.

JOHN J. ROEMER.
DONALD W. KAISER.

No references cited.